(12) United States Patent
Baxter et al.

(10) Patent No.: US 10,399,092 B2
(45) Date of Patent: Sep. 3, 2019

(54) AIR-SPARGED HYDROCYCLONE FOR CRYOGENIC GAS VAPOR SEPARATION

(71) Applicants: Larry Baxter, Orem, UT (US); Christopher Hoeger, Provo, UT (US); Aaron Sayre, Spanish Fork, UT (US); Skyler Chamberlain, Provo, UT (US); Kyler Stitt, Lindon, UT (US); Eric Mansfield, Spanish Fork, UT (US); Stephanie Burt, Provo, UT (US); Jacom Chamberlain, Provo, UT (US); Andrew Baxter, Spanish Fork, UT (US); Nathan Davis, Bountiful, UT (US)

(72) Inventors: Larry Baxter, Orem, UT (US); Christopher Hoeger, Provo, UT (US); Aaron Sayre, Spanish Fork, UT (US); Skyler Chamberlain, Provo, UT (US); Kyler Stitt, Lindon, UT (US); Eric Mansfield, Spanish Fork, UT (US); Stephanie Burt, Provo, UT (US); Jacom Chamberlain, Provo, UT (US); Andrew Baxter, Spanish Fork, UT (US); Nathan Davis, Bountiful, UT (US)

(73) Assignee: Sustainable Energy Solutions, LLC, Orem, UT (US)

(*) Notice: Subject to any disclaimer, the term of this patent is extended or adjusted under 35 U.S.C. 154(b) by 157 days.

(21) Appl. No.: 15/439,482

(22) Filed: Feb. 22, 2017

(65) Prior Publication Data
US 2018/0238620 A1    Aug. 23, 2018

(51) Int. Cl.
*B01F 3/04*    (2006.01)
*B04C 5/14*    (2006.01)
(Continued)

(52) U.S. Cl.
CPC ............... *B04C 5/14* (2013.01); *B01D 45/12* (2013.01); *B01D 53/002* (2013.01); *B01F 3/04* (2013.01); *B04C 5/04* (2013.01); *B04C 5/081* (2013.01); *B04C 5/10* (2013.01); *B04C 5/13* (2013.01); *F25J 3/061* (2013.01); *F25J 3/067* (2013.01); *F25J 3/0625* (2013.01); *F25J 3/0635* (2013.01); *F25J 3/0655* (2013.01); *F25J 3/0695* (2013.01); *B01D 2258/0283* (2013.01); *B04C 2009/008* (2013.01); *F25J 2205/10* (2013.01);
(Continued)

(58) Field of Classification Search
CPC .................................. B01F 3/04; B01F 13/02
USPC ........................................................ 261/79.2
See application file for complete search history.

(56) References Cited

U.S. PATENT DOCUMENTS 5,171,405 A * 12/1992 Torregrossa .......... B01F 5/0057
162/243

* cited by examiner

*Primary Examiner* — Robert A Hopkins (57) ABSTRACT

An air-sparged hydrocyclone for separating a vapor from a carrier gas is disclosed. The cyclone comprises a porous sparger covered by an outer gas plenum. A cryogenic liquid is injected to a tangential feed inlet at a velocity that induces a tangential flow and a cyclone vortex in the air-sparged hydrocyclone. The carrier gas is injected into the cyclone through the porous sparger. The vapor dissolves, condenses, desublimates, or a combination thereof, forming a vapor-depleted carrier gas and a vapor-enriched cryogenic liquid. The vapor-depleted carrier gas is drawn through a vortex finder and the vapor-enriched cryogenic liquid is drawn through an apex nozzle outlet. In this manner, the vapor is removed from the carrier gas.

20 Claims, 6 Drawing Sheets

(51) Int. Cl.
*B01D 53/00* (2006.01)
*B01D 45/12* (2006.01)
*B04C 5/04* (2006.01)
*B04C 5/13* (2006.01)
*B04C 5/081* (2006.01)
*B04C 5/10* (2006.01)
*F25J 3/06* (2006.01)
*B04C 9/00* (2006.01)

(52) U.S. Cl.
CPC ........ *F25J 2205/20* (2013.01); *F25J 2205/90* (2013.01); *F25J 2210/70* (2013.01); *F25J 2270/904* (2013.01); *F25J 2290/44* (2013.01); *Y02C 10/12* (2013.01)

AIR-SPARGED HYDROCYCLONE FOR CRYOGENIC GAS VAPOR SEPARATION

This invention was made with government support under DE-FE0028697 awarded by The Department of Energy. The government has certain rights in the invention.

BACKGROUND

Field of the Invention

This invention relates generally to the field of cryogenic gas-vapor separation. Our immediate interest is in removal of a vapor, such as carbon dioxide, from a carrier gas, such as flue gas, using an air-sparged hydrocyclone.

Related Technology

As cryogenic technologies become more prevalent, new methods of separating undesirable products, such as carbon dioxide, sulfur dioxide, and other pollutants, from a carrier gas are needed. Hydrocyclones are a broadly used, very mature technology capable of separations of solids by mass, separation of non-miscible liquids, and separation of solids from gases. They are not used in gas/vapor separation because the cyclone vortex produced in a hydrocyclone does not cause separation in gases by mass.

Air-sparged hydrocyclones, a modified type of hydrocyclone, are a mature technology used in fields such as mineral processing, pulp and paper, and medical waste, to remove solids from liquids by an in-line froth floatation technique. They are used exclusively for separating an entrained solid from a carrier liquid. The use of air-sparged hydrocyclones in gas-vapor separations or cryogenics is not present in the art.

U.S. Pat. No. 4,997,549 to Atwood teaches an air-sparged hydrocyclone separator. This disclosure is pertinent and may benefit from the devices disclosed herein and is hereby incorporated for reference in its entirety for all that it teaches.

U.S. Pat. No. 4,279,743 to Miller teaches an air-sparged hydrocyclone and method. This disclosure is pertinent and may benefit from the devices disclosed herein and is hereby incorporated for reference in its entirety for all that it teaches.

U.S. Pat. No. 2,829,771 to Miller teaches a process and apparatus for classifying solid materials in a hydrocyclone. This disclosure is pertinent and may benefit from the devices disclosed herein and is hereby incorporated for reference in its entirety for all that it teaches.

U.S. Pat. No. 5,116,488 to Torregrossa teaches gas sparged centrifugal device. This disclosure is pertinent and may benefit from the devices disclosed herein and is hereby incorporated for reference in its entirety for all that it teaches.

SUMMARY

An air-sparged hydrocyclone for separating a vapor from a carrier gas is disclosed. The cyclone comprises a vessel having a generally cylindrical shape with a generally circular cross-section; a tangential feed inlet for a cryogenic liquid, attached to a cylindrical wall of the vessel on an upper end of the vessel, wherein the cryogenic liquid is injected to the tangential feed inlet at a velocity that induces a tangential flow and a cyclone vortex in the air-sparged hydrocyclone. At least a portion of a wall of the air-sparged hydrocyclone comprises a porous sparger, covered by an outer gas plenum which encloses the porous sparger. The outer gas plenum contains at least one inlet for the carrier gas. The carrier gas is injected into the cryogenic liquid, causing the vapor to dissolve, condense, desublimate, or a combination thereof, forming a vapor-depleted carrier gas and a vapor-enriched cryogenic liquid. The cyclone further comprises a vortex finder outlet on a top of the inner vessel, perpendicular to the tangential feed inlet, through which the vapor-depleted gas is drawn and a lower section of the inner vessel that tapers conically down in size to an apex nozzle outlet through which the vapor-enriched cryogenic liquid is drawn. The vessel, the tangential feed inlet, the vortex finder, the lower section, and the apex nozzle outlet are sized to cause a gas/liquid separation. In this manner, the vapor is removed from the carrier gas.

The vapor may be carbon dioxide, nitrogen oxide, sulfur dioxide, nitrogen dioxide, sulfur trioxide, hydrogen sulfide, hydrogen cyanide, water, hydrocarbons with a freezing point above 0 C, or combinations thereof. The carrier gas may be combustion flue gas, syngas, producer gas, natural gas, steam reforming gas, any hydrocarbon that has higher volatility than water, light gases, or combinations thereof. The cryogenic liquid may be any compound or mixture of compounds with a freezing point below a temperature at which a solid forms from the vapor.

The vessel, the tangential feed inlet, the vortex finder, the lower section, and the apex nozzle outlet may be aluminum, stainless steel, polymers, ceramics, or combinations thereof.

The porous sparger may encircle the wall of the air-sparged hydrocyclone and may comprise a portion of the wall of the air-sparged hydrocyclone between the tangential feed inlet and the apex nozzle outlet. The porous sparger may comprise a plurality of horizontal sections, each with an independent gas plenum, and each injecting a portion of the carrier gas. The porous sparger may comprise a plurality of horizontal sections, each with an independent gas plenum, injecting a coolant gas into the gas plenum nearest the apex nozzle outlet, and injecting a portion of the carrier gas into the other gas plenums. The porous sparger may begin below the tangential feed inlet and wrap around the vessel in a helical manner, ending above the lower section, such that the porous sparger follows the cyclone vortex path through the vessel.

The porous sparger may be flush with an inner portion of the wall of the air-sparged hydrocyclone such that the porous sparger does not extend into the tangential flow of the cryogenic liquid. The porous sparger may be not flush with an inner portion of the wall of the air-sparged hydrocyclone such that the porous sparger extends into the tangential flow of the cryogenic liquid.

Any surface of the porous sparger exposed to the cryogenic liquid may be a material that inhibits adsorption of gases, prevents deposition of solids, or a combination thereof. This material may comprise ceramics, polytetrafluoroethylene, polychlorotrifluoroethylene, natural diamond, man-made diamond, chemical-vapor deposition diamond, polycrystalline diamond, or combinations thereof. The porous sparger may be a membrane sparger, a sintered metal sparger, an orifice sparger, an aeration stone, or combinations thereof.

The air-sparged hydrocyclone may be insulated. The insulation may be perlite, vacuum-chamber, or combinations thereof. The insulation may comprise active cooling.

A portion of the carrier gas may be injected into the cryogenic liquid before the tangential feed inlet.

The vortex finder may operate under a partial vacuum.

The vessel may have fins on an inner wall oriented to cause turbulence.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
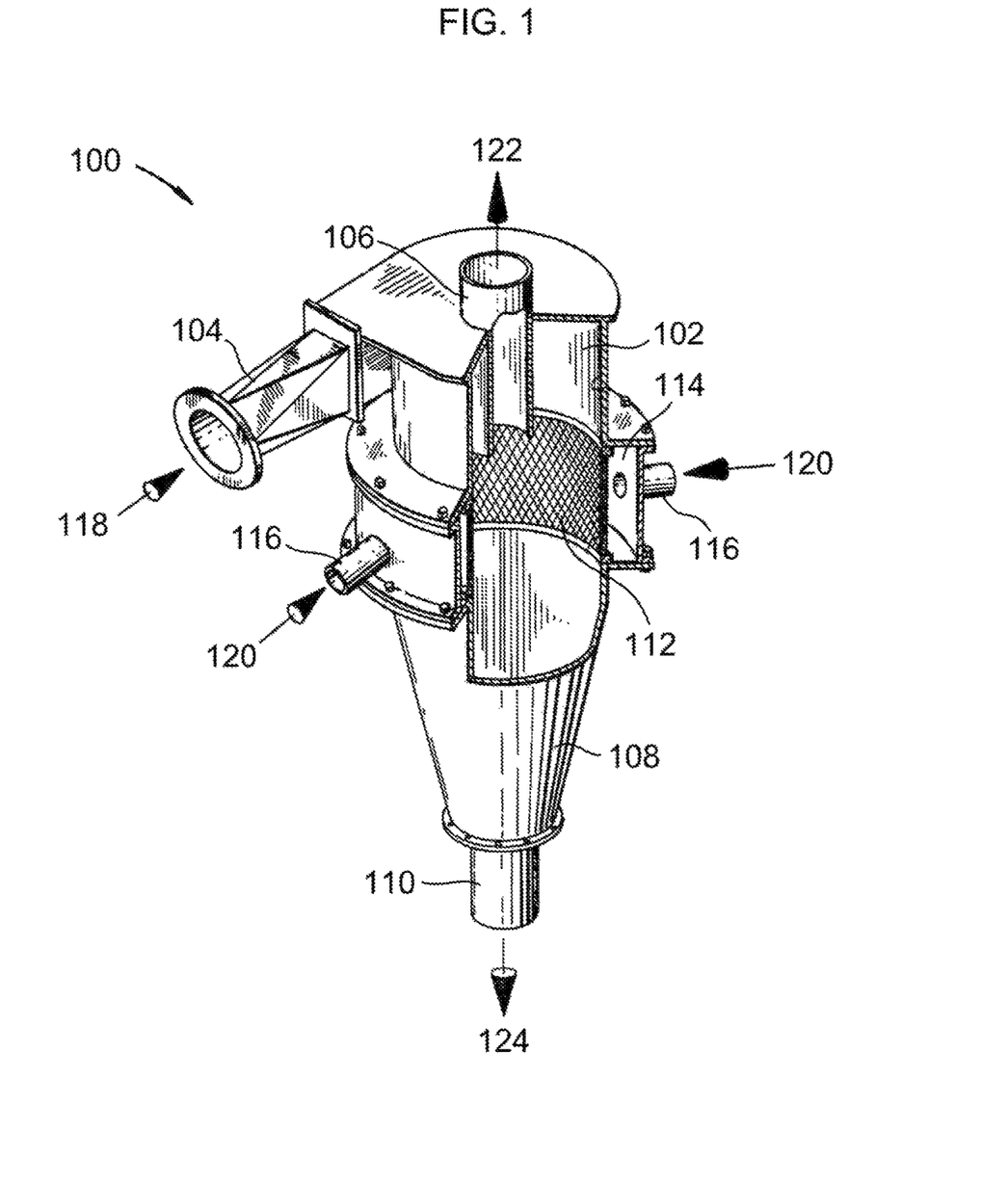
FIG. 1 shows an isometric view of an air-sparged hydrocyclone.

Referring to FIG. 1, an isometric view of an air-sparged hydrocyclone 100 is shown, according to one embodiment of the present invention. The air-sparged hydrocyclone comprises vessel 102, tangential feed inlet 104, vortex finder outlet 106, tapered lower section 108, and apex nozzle outlet 110. A portion of the cylindrical wall comprises porous sparger 112 enclosed by outer gas plenum 114. Porous sparger 112 encircles the circumference of vessel 102 between tangential feed inlet 104 and tapered lower section 108. Outer gas plenum 114 has inlets 116. Cryogenic liquid 118 is provided to tangential feed inlet 104, causing cryogenic liquid 118 to form a tangential flow and a cyclone vortex through vessel 102. Carrier gas 120 is provided to gas inlets 116, thereby bubbling through porous sparger 112 into cryogenic liquid 118. Carrier gas 120 contains a vapor that dissolves, condenses, desublimates, or a combination thereof into cryogenic liquid 118, forming vapor-depleted carrier gas 122 and vapor-enriched cryogenic liquid 124. Vapor-enriched cryogenic liquid 124 consists of cryogenic liquid 118 with solidified vapor, dissolved vapor, liquefied vapor, or a combination thereof. The tangential flow and cyclone vortex induce flow across the inner surface of vessel 102 that prevents deposition or desublimation onto the inner surface, including on the surface of and in the holes of porous sparger 112. In some embodiments, a portion of carrier gas 120 is injected into cryogenic liquid 118 before tangential feed inlet 104, providing more vapor removal residence time.

Figure 2:
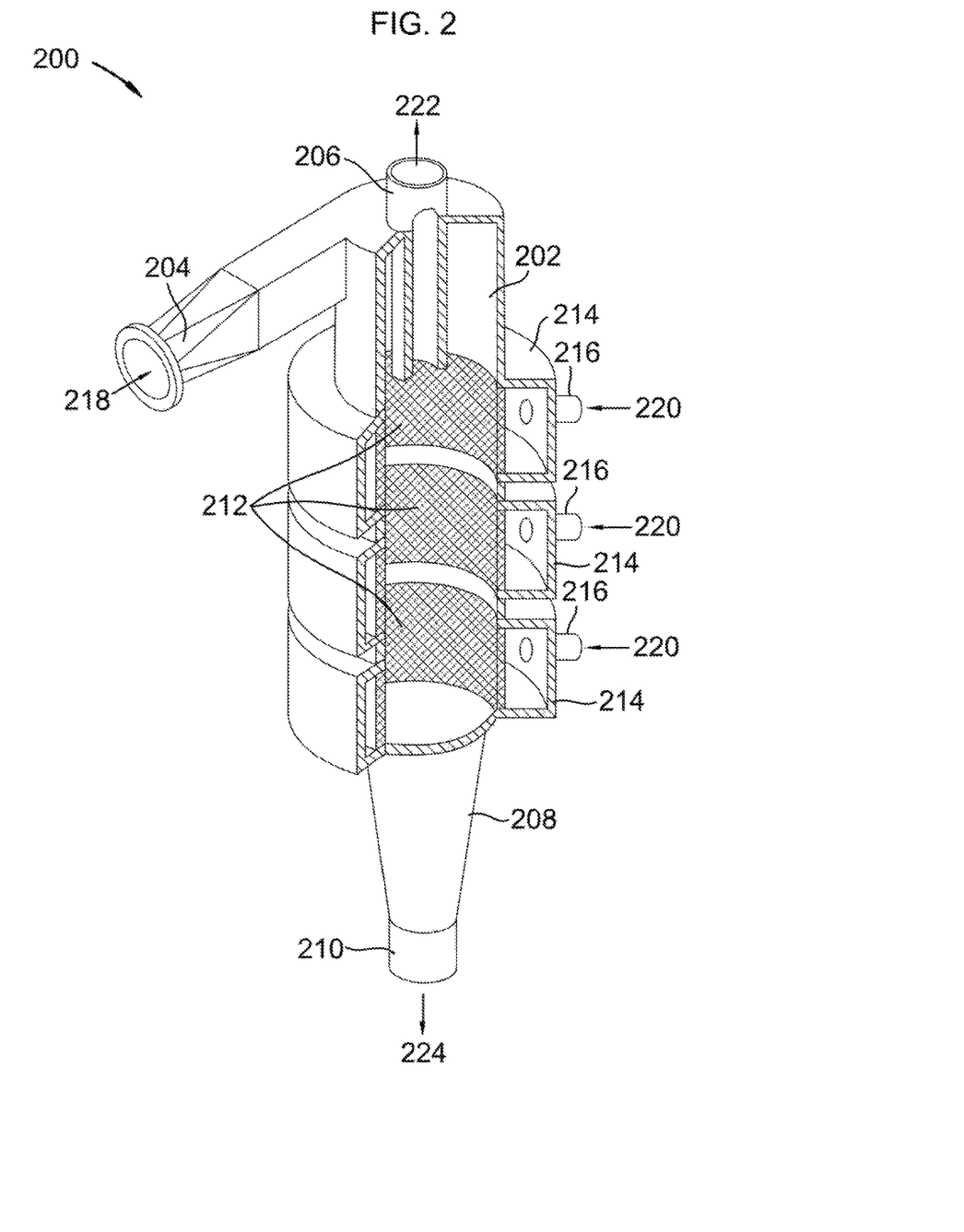
FIG. 2 shows an isometric view of an air-sparged hydrocyclone.

Referring to FIG. 2, an isometric view of an air-sparged hydrocyclone 200 is shown, according to one embodiment of the present invention. The air-sparged hydrocyclone comprises vessel 202, tangential feed inlet 204, vortex finder outlet 206, tapered lower section 208, and apex nozzle outlet 210. Three horizontal portions of the cylindrical wall comprise porous spargers 212 enclosed by outer gas plenums 214. Porous spargers 212 encircle the circumference of vessel 202 between tangential feed inlet 204 and tapered lower section 208. Outer gas plenums 214 have inlets 216. Cryogenic liquid 218 is provided to tangential feed inlet 204, causing cryogenic liquid 118 to form a tangential flow and a cyclone vortex through vessel 202. Carrier gas 220 is provided to gas inlets 216, thereby bubbling through porous spargers 212 into cryogenic liquid 218. Carrier gas 220 contains a vapor that dissolves, condenses, desublimates, or a combination thereof into cryogenic liquid 218, forming vapor-depleted carrier gas 222 and vapor-enriched cryogenic liquid 224. Vapor-enriched cryogenic liquid consists of cryogenic liquid with solidified vapor, dissolved vapor, liquefied vapor, or a combination thereof. The tangential flow and cyclone vortex induce flow across the inner surface of vessel 202 that prevents deposition or desublimation onto the surface, including on the surface of and in the holes of porous spargers 212. In one embodiment, the bottom-most gas plenum 214 has a coolant gas injected rather than carrier gas. This cools cryogenic liquid 218 further, causing increased vapor removal before apex nozzle outlet 210. In some embodiments, a portion of carrier gas 220 is injected into cryogenic liquid 218 before tangential feed inlet 204, providing more vapor removal residence time.

Figure 3:
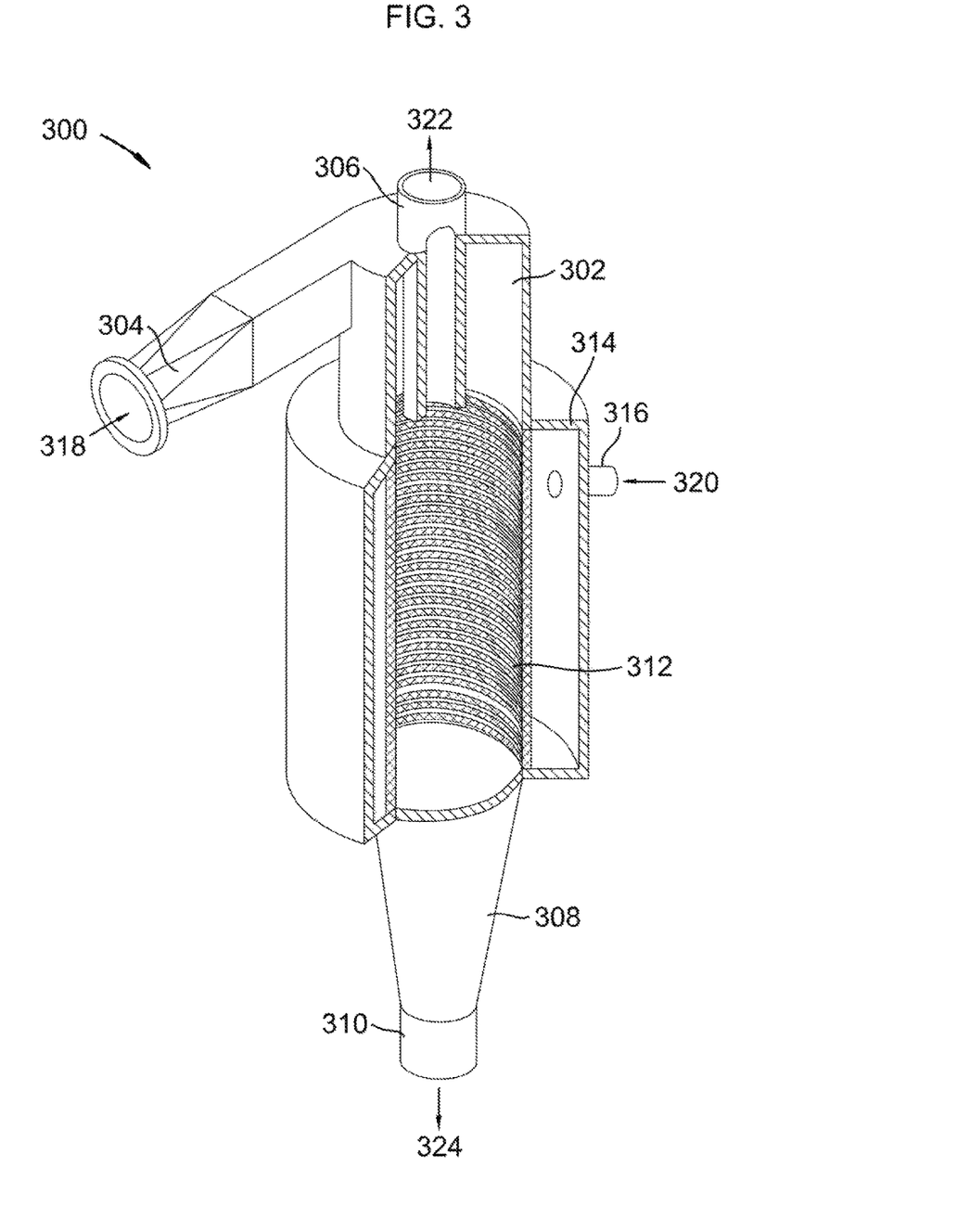
FIG. 3 shows an isometric view of an air-sparged hydrocyclone.

Referring to FIG. 3, an isometric view of an air-sparged hydrocyclone 300 is shown, according to one embodiment of the present invention. The air-sparged hydrocyclone comprises vessel 302, tangential feed inlet 304, vortex finder outlet 306, tapered lower section 308, and apex nozzle outlet 310. A portion of the cylindrical wall comprises porous sparger 312 enclosed by outer gas plenum 314. Porous sparger 312 begins below tangential feed inlet 304 and wraps around vessel 302 in a helical manner, ending above tapered lower section 308, such that porous sparger 312 follows a cyclone vortex path through the vessel. Outer gas plenum 314 has inlets 316. Cryogenic liquid 318 is provided to tangential feed inlet 304, causing cryogenic liquid 318 to form a tangential flow and the cyclone vortex through vessel 302. Carrier gas 320 is provided to gas inlets 316, thereby bubbling through porous sparger 312 into cryogenic liquid 318. Carrier gas 320 contains a vapor that dissolves, condenses, desublimates, or a combination thereof into cryogenic liquid 318, forming vapor-depleted carrier gas 322 and vapor-enriched cryogenic liquid 324. Vapor-enriched cryogenic liquid consists of cryogenic liquid 318 with solidified vapor, dissolved vapor, liquefied vapor, or a combination thereof. The tangential flow and cyclone vortex induce flow across the inner surface of vessel 302 that prevents deposition or desublimation onto the surface, including on the surface of and in the holes of porous sparger 312. In some embodiments, a portion of carrier gas 320 is injected into cryogenic liquid 318 before tangential feed inlet 304, providing more vapor removal residence time.

Figure 4:
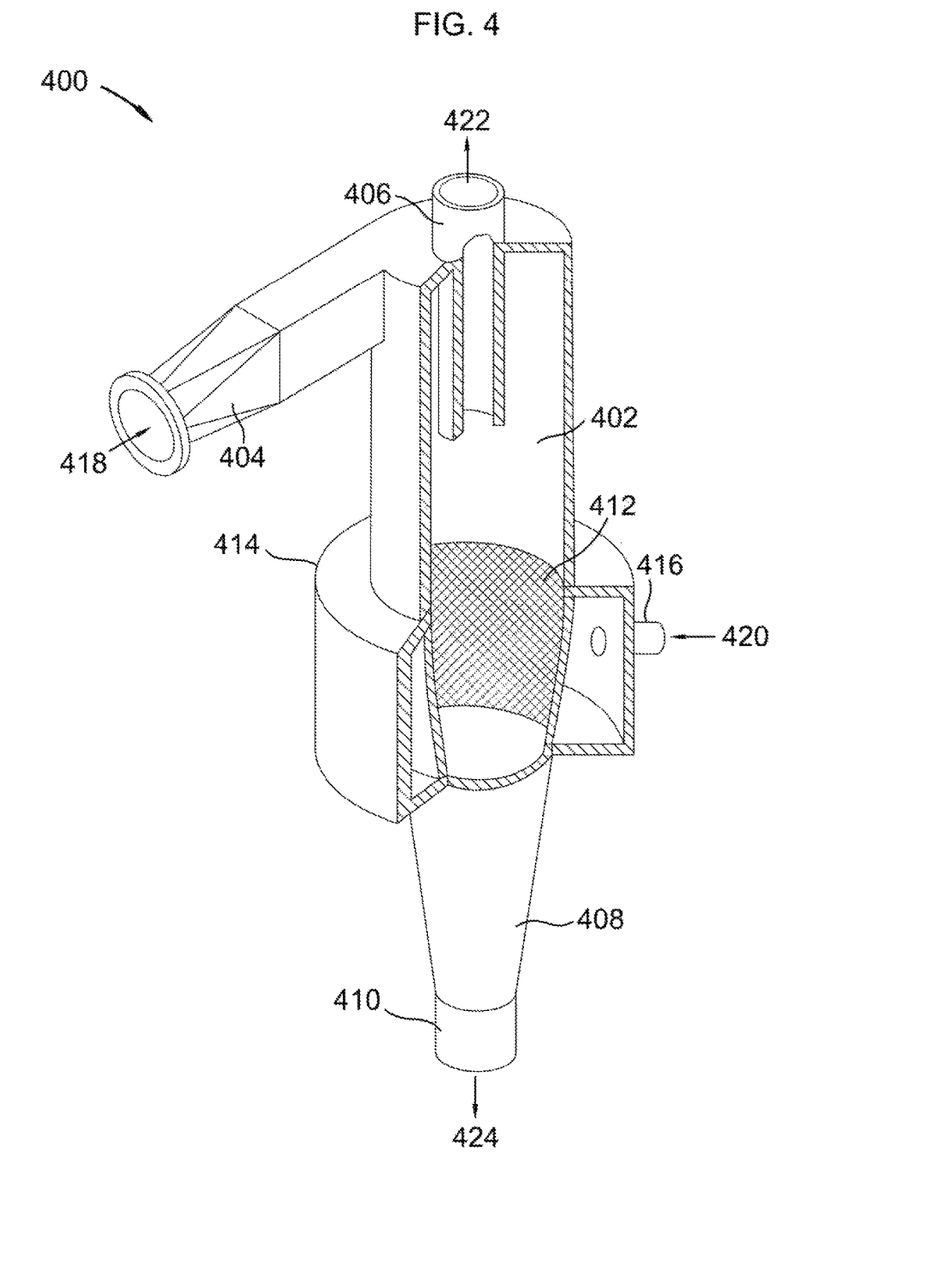
FIG. 4 shows a cross-sectional view of the vessel, outer gas plenum, and porous sparger of an air-sparged hydrocyclone.

Referring to FIG. 4, an isometric view of an air-sparged hydrocyclone 400 is shown, according to one embodiment of the present invention. The air-sparged hydrocyclone comprises vessel 402, tangential feed inlet 404, vortex finder outlet 406, tapered lower section 408, and apex nozzle outlet 410. A portion of the wall of tapered lower section 408 comprises porous sparger 412 enclosed by outer gas plenum 414. Porous sparger 412 encircles the circumference of tapered lower section 408 vessel 402 and apex nozzle outlet 410. Outer gas plenum 414 has inlets 416. Cryogenic liquid 418 is provided to tangential feed inlet 404, causing cryogenic liquid 418 to form a tangential flow and a cyclone vortex through vessel 402. Carrier gas 420 is provided to gas inlets 416, thereby bubbling through porous sparger 412 into cryogenic liquid 418. Carrier gas 420 contains a vapor that dissolves, condenses, desublimates, or a combination thereof into cryogenic liquid 418, forming vapor-depleted carrier gas 422 and vapor-enriched cryogenic liquid 424. Vapor-enriched cryogenic liquid consists of cryogenic liquid with solidified vapor, dissolved vapor, liquefied vapor, or a combination thereof. The tangential flow and cyclone vortex induce flow across the inner surface of vessel 402 that prevents deposition or desublimation onto the inner surface, including on the surface of and in the holes of porous sparger 412. In some embodiments, a portion of carrier gas 420 is injected into cryogenic liquid 418 before tangential feed inlet 404, providing more vapor removal residence time.

Figure 5:
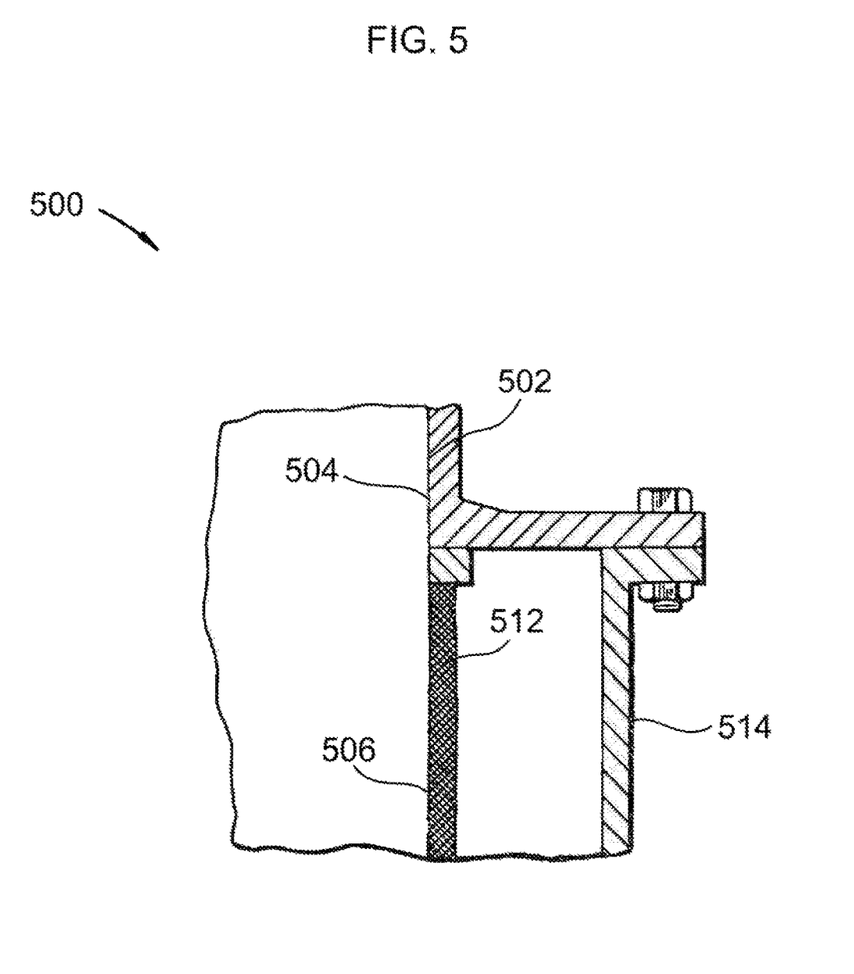
FIG. 5 shows a cross-sectional view of the vessel, outer gas plenum, and porous sparger of an air-sparged hydrocyclone.

Referring to FIG. 5, a cross-section of vessel 102, outer gas plenum 114, and porous sparger 112, of FIG. 1, is shown generally at 500, as per one embodiment of the present invention. Inner surface 506 of porous sparger 512 is flush with inner wall 504 of vessel 502. This allows the cyclonic vortex to pass across porous sparger 512 without any solid disruptions.

Figure 6:
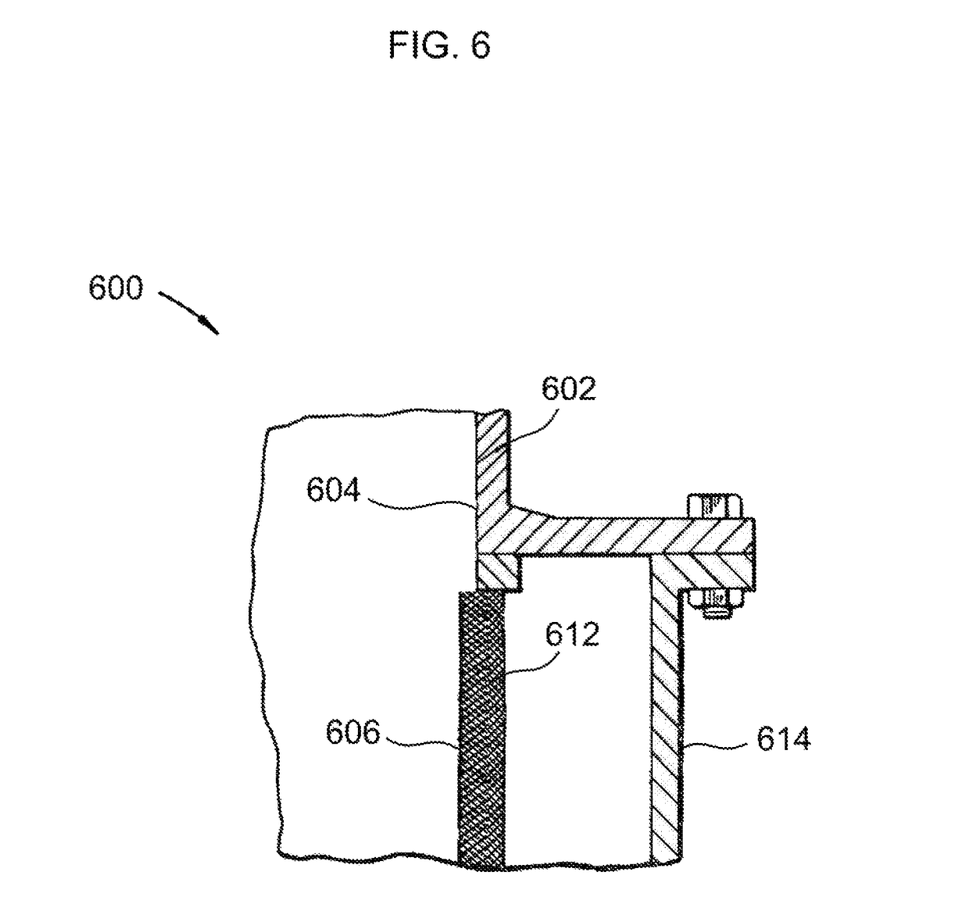
FIG. 6 shows a cross-sectional view of the vessel, outer gas plenum, and porous sparger of FIG. 1.

Referring to FIG. 6, a cross-section of vessel 102, outer gas plenum 114, and porous sparger 112, of FIG. 1, is shown generally at 600, as per one embodiment of the present invention. Inner surface 606 of porous sparger 612 is not flush with inner wall 604 of vessel 602, extending partially into the path of the cyclonic vortex, which causes disruptions to flow that may provide better vapor removal.

In some embodiments, the vapor comprises carbon dioxide, nitrogen oxide, sulfur dioxide, nitrogen dioxide, sulfur trioxide, hydrogen sulfide, hydrogen cyanide, water, hydrocarbons with a freezing point above 0 C, or combinations thereof. In some embodiments, the carrier gas comprises combustion flue gas, syngas, producer gas, natural gas, steam reforming gas, any hydrocarbon that has higher volatility than water, light gases, or combinations thereof. In some embodiments, the cryogenic liquid comprises any compound or mixture of compounds with a freezing point below a temperature at which a solid forms from the vapor.

In some embodiments, the vessel, the tangential feed inlet, the vortex finder, the lower section, and the apex nozzle outlet comprise aluminum, stainless steel, polymers, ceramics, or combinations thereof.

In some embodiments, any surface of the porous sparger exposed to the cryogenic liquid comprises a material that inhibits adsorption of gases, prevents deposition of solids, or a combination thereof. This material may comprise ceramics, polytetrafluoroethylene, polychlorotrifluoroethylene, natural diamond, man-made diamond, chemical-vapor deposition diamond, polycrystalline diamond, or combinations thereof. In some embodiments, the porous sparger comprises a membrane sparger, a sintered metal sparger, an orifice sparger, an aeration stone, or combinations thereof.

In some embodiments, the air-sparged hydrocyclone is insulated. This insulation may comprise perlite, vacuum-chamber, or combinations thereof. In some embodiments, the insulation comprises active cooling.

In some embodiments, the vortex finder operates under a partial vacuum.

In some embodiments, the vessel has fins on an inner wall oriented to cause turbulence.

The invention claimed is:

1. An air-sparged hydrocyclone for separating a vapor from a carrier gas, the apparatus comprising:
    a vessel having a generally cylindrical shape with a generally circular cross-section;
    a tangential feed inlet for a cryogenic liquid, attached to a cylindrical wall of the vessel on an upper end of the vessel, wherein the cryogenic liquid is injected to the tangential feed inlet at a velocity that induces a tangential flow and a cyclone vortex in the air-sparged hydrocyclone;
    at least a portion of a wall of the air-sparged hydrocyclone comprising a porous sparger, covered by an outer gas plenum which encloses the porous sparger, the outer gas plenum containing at least one inlet for the carrier gas, wherein the carrier gas is injected into the cryogenic liquid, causing the vapor to desublimate, forming a vapor-depleted carrier gas and a vapor-enriched cryogenic liquid, wherein the porous sparger encircles the wall of the air-sparged hydrocyclone and comprises a portion of the wall of the air-sparged hydrocyclone between the tangential feed inlet and the lower section, and wherein the porous sparger comprises a plurality of horizontal sections, each with an independent gas plenum, and each injecting a portion of the carrier gas;
    a vortex finder outlet on a top of the inner vessel, perpendicular to the tangential feed inlet, through which the vapor-depleted gas is drawn;
    a lower section of the inner vessel that tapers conically down in size to an apex nozzle outlet through which the vapor-enriched cryogenic liquid is drawn; and,
    the vessel, the tangential feed inlet, the vortex finder, the lower section, and the apex nozzle outlet sized to cause a gas/liquid separation;
    whereby the vapor is removed from the carrier gas.

2. The air-sparged hydrocyclone of claim 1, wherein the vessel, the tangential feed inlet, the vortex finder, the lower section, and the apex nozzle outlet comprise aluminum, stainless steel, polymers, ceramics, or combinations thereof.

3. The air-sparged hydrocyclone of claim 1, wherein the porous sparger is flush with an inner portion of the wall of the air-sparged hydrocyclone such that the porous sparger does not extend into the tangential flow of the cryogenic liquid.

4. The air-sparged hydrocyclone of claim 1, wherein the porous sparger is not flush with an inner portion of the wall of the air-sparged hydrocyclone such that the porous sparger extends into the tangential flow of the cryogenic liquid.

5. The air-sparged hydrocyclone of claim 1, wherein any surface of the porous sparger exposed to the cryogenic liquid comprises a material that inhibits adsorption of gases, prevents deposition of solids, or a combination thereof.

6. The air-sparged hydrocyclone of claim 5, wherein the material comprises ceramics, polytetrafluoroethylene, polychlorotrifluoroethylene, natural diamond, man-made diamond, chemical-vapor deposition diamond, polycrystalline diamond, or combinations thereof.

7. The air-sparged hydrocyclone of claim 1, wherein the porous sparger comprises a membrane sparger, a sintered metal sparger, an orifice sparger, an aeration stone, or combinations thereof.

8. The air-sparged hydrocyclone of claim 1, wherein a portion of the carrier gas is injected into the cryogenic liquid before the tangential feed inlet.

9. The air-sparged hydrocyclone of claim 1, wherein the vortex finder operates under a partial vacuum.

10. An air-sparged hydrocyclone for separating a vapor from a carrier gas, the apparatus comprising:
- a vessel having a generally cylindrical shape with a generally circular cross-section;
- a tangential feed inlet for a cryogenic liquid, attached to a cylindrical wall of the vessel on an upper end of the vessel, wherein the cryogenic liquid is injected to the tangential feed inlet at a velocity that induces a tangential flow and a cyclone vortex in the air-sparged hydrocyclone;
- at least a portion of a wall of the air-sparged hydrocyclone comprising a porous sparger, covered by an outer gas plenum which encloses the porous sparger, the outer gas plenum containing at least one inlet for the carrier gas, wherein the carrier gas is injected into the cryogenic liquid, causing the vapor to dissolve, condense, desublimate, or a combination thereof, forming a vapor-depleted carrier gas and a vapor-enriched cryogenic liquid, wherein the porous sparger begins below the tangential feed inlet and wraps around the vessel in a helical manner, ending above the lower section, such that the porous sparger follows the cyclone vortex path through the vessel;
- a vortex finder outlet on a top of the inner vessel, perpendicular to the tangential feed inlet, through which the vapor-depleted gas is drawn;
- a lower section of the inner vessel that tapers conically down in size to an apex nozzle outlet through which the vapor-enriched cryogenic liquid is drawn; and,
- the vessel, the tangential feed inlet, the vortex finder, the lower section, and the apex nozzle outlet sized to cause a gas/liquid separation;
- whereby the vapor is removed from the carrier gas.

11. The air-sparged hydrocyclone of claim 10, wherein a portion of the carrier gas is injected into the cryogenic liquid before the tangential feed inlet.

12. The air-sparged hydrocyclone of claim 10, wherein the vortex finder operates under a partial vacuum.

13. The air-sparged hydrocyclone of claim 10, wherein any surface of the porous sparger exposed to the cryogenic liquid comprises a material that inhibits adsorption of gases, prevents deposition of solids, or a combination thereof.

14. An air-sparged hydrocyclone for separating a vapor from a carrier gas, the apparatus comprising:
- a vessel having a generally cylindrical shape with a generally circular cross-section;
- a tangential feed inlet for a cryogenic liquid, attached to a cylindrical wall of the vessel on an upper end of the vessel, wherein the cryogenic liquid is injected to the tangential feed inlet at a velocity that induces a tangential flow and a cyclone vortex in the air-sparged hydrocyclone;
- at least a portion of a wall of the air-sparged hydrocyclone comprising a porous sparger, covered by an outer gas plenum which encloses the porous sparger, the outer gas plenum containing at least one inlet for the carrier gas, wherein the carrier gas is injected into the cryogenic liquid, causing the vapor to dissolve, condense, desublimate, or a combination thereof, forming a vapor-depleted carrier gas and a vapor-enriched cryogenic liquid;
- a vortex finder outlet on a top of the inner vessel, perpendicular to the tangential feed inlet, through which the vapor-depleted gas is drawn;
- a lower section of the inner vessel that tapers conically down in size to an apex nozzle outlet through which the vapor-enriched cryogenic liquid is drawn;
- the vessel, the tangential feed inlet, the vortex finder, the lower section, and the apex nozzle outlet sized to cause a gas/liquid separation; and,
- wherein the air-sparged hydrocyclone is insulated;
- whereby the vapor is removed from the carrier gas.

15. The air-sparged hydrocyclone of claim 14, wherein a portion of the carrier gas is injected into the cryogenic liquid before the tangential feed inlet.

16. The air-sparged hydrocyclone of claim 14, wherein the vortex finder operates under a partial vacuum.

17. The air-sparged hydrocyclone of claim 14, wherein any surface of the porous sparger exposed to the cryogenic liquid comprises a material that inhibits adsorption of gases, prevents deposition of solids, or a combination thereof.

18. The air-sparged hydrocyclone of claim 14, wherein the porous sparger comprises a membrane sparger, a sintered metal sparger, an orifice sparger, an aeration stone, or combinations thereof.

19. The air-sparged hydrocyclone of claim 14, wherein the insulation comprises perlite, vacuum-chamber, or combinations thereof.

20. The air-sparged hydrocyclone of claim 14, wherein the insulation comprises active cooling.

* * * * *